No. 648,030. Patented Apr. 24, 1900.
M. G. HUBBARD, Jr.
CAR TRUCK.
(Application filed May 7, 1897.)
(No Model.) 2 Sheets—Sheet 1.
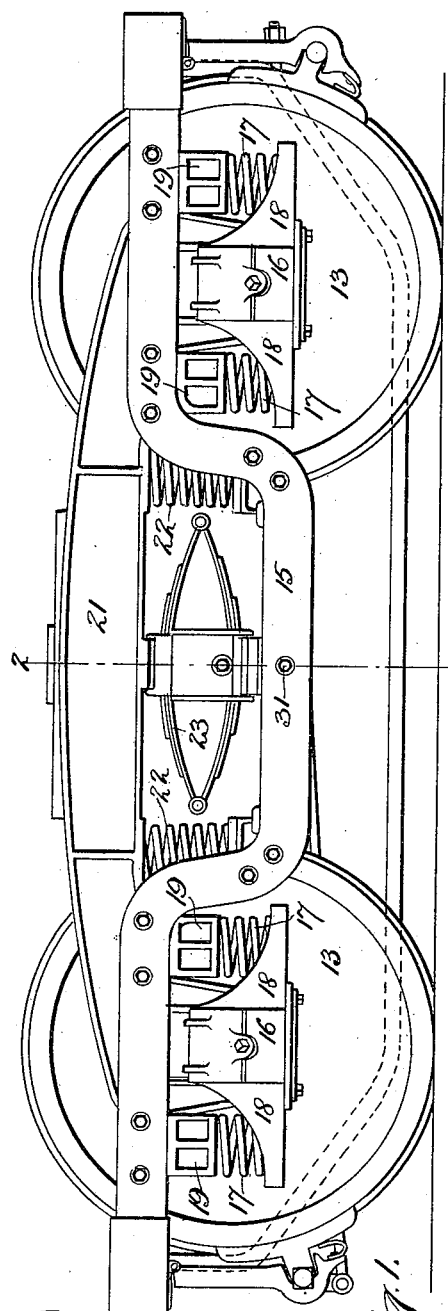
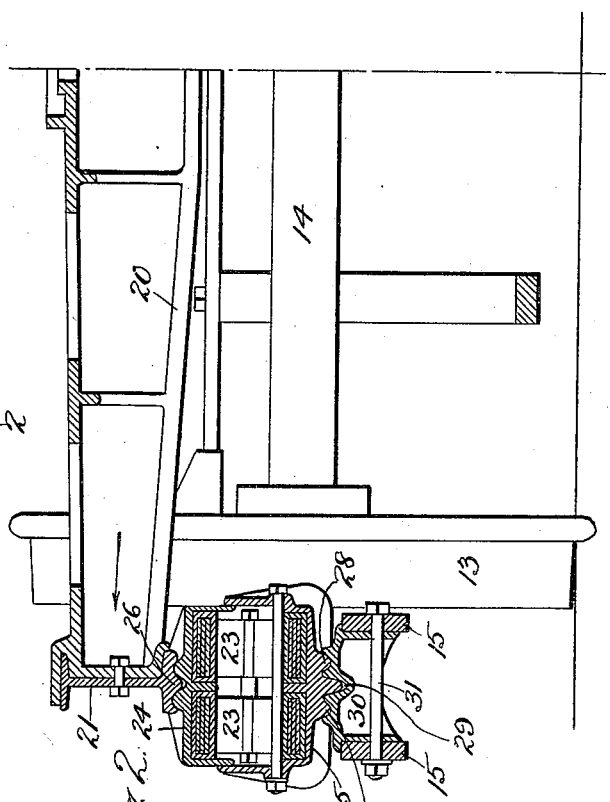

No. 648,030. Patented Apr. 24, 1900.
M. G. HUBBARD, Jr.
CAR TRUCK.
(Application filed May 7, 1897.)
(No Model.) 2 Sheets—Sheet 2.
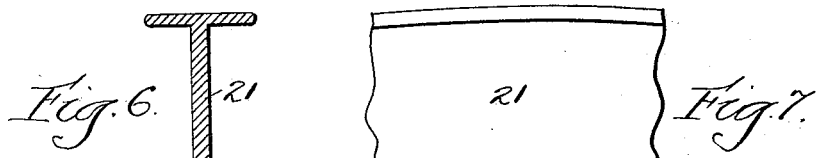
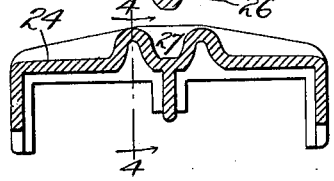
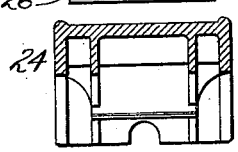
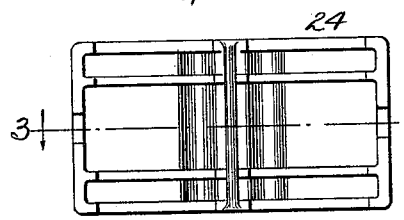
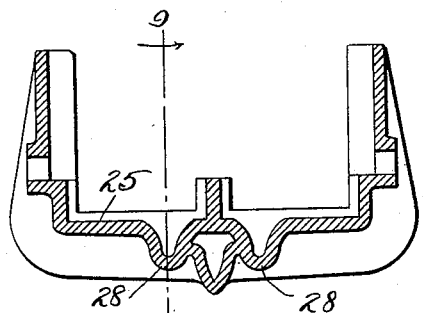
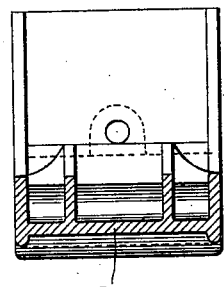
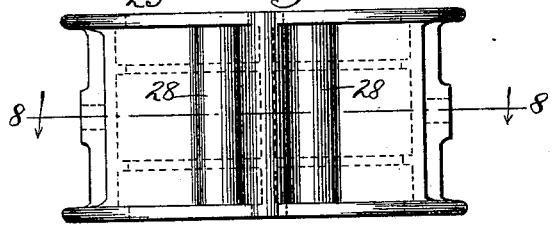
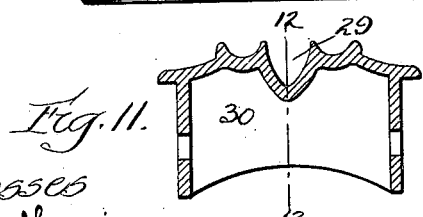
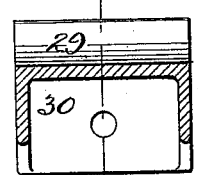
Witnesses
Inventor
Moses G. Hubbard Jr.

UNITED STATES PATENT OFFICE.

MOSES G. HUBBARD, JR., OF AUSTIN, ILLINOIS, ASSIGNOR TO THE McGUIRE MANUFACTURING COMPANY, OF CHICAGO, ILLINOIS.

CAR-TRUCK.

SPECIFICATION forming part of Letters Patent No. 648,030, dated April 24, 1900.

Application filed May 7, 1897. Serial No. 635,505. (No model.)

*To all whom it may concern:*

Be it known that I, MOSES G. HUBBARD, Jr., a citizen of the United States, residing in Austin, in the county of Cook and State of Illinois, have invented certain new and useful Improvements in Car-Trucks, of which the following is a specification.

My invention relates to car-trucks, and has to do particularly with trucks in which the car-body is arranged to move laterally of the truck.

It has for its object to provide means whereby such lateral movement of the car-body is elastically resisted and the car-body returned to its normal position when the extraordinary strain causing such lateral movement ceases.

In the accompanying drawings, wherein I have shown my improvements applied to a truck in which a laterally-movable bolster is provided to receive the car-body, such bolster being elastically supported upon an equalizer-frame resting upon and supported by the axle-journal boxes, which truck forms the subject-matter of a joint application of even date herewith by William A. McGuire and myself, Figure 1 is a side elevation of a truck embodying my improvements. Fig. 2 is a partial cross-section on line 2 2 of Fig 1. Fig. 3 is a section of the upper member of the pedestal on line 3 3 of Fig. 5. Fig. 4 is a vertical section on line 4 4 of Fig. 3. Fig. 5 is a bottom view of the upper member of the pedestal. Fig. 6 is a cross-section of the upper rocker-plate. Fig. 7 is a side elevation of a portion thereof. Fig. 8 is a section of the lower member of the pedestal on line 8 8 of Fig. 10. Fig. 9 is a cross-section on line 9 9 of Fig. 8. Fig. 10 is a bottom view of the lower member of the pedestal. Fig. 11 is a section of the lower rocker-plate on line 11 11 of Fig. 12. Fig. 12 is a section on line 12 12 of Fig. 11.

As described in the McGuire and Hubbard application above referred to, the truck illustrated in Figs. 1 and 2 comprises the usual wheels and axles 13 14, respectively, and equalizer-frame 15, which rests upon the axle-journal boxes 16 and is supported by springs 17. The arrangement of the supporting-springs 17 as herein shown is slightly different from that shown in said McGuire and Hubbard application, in the form shown in Fig. 1 the springs being carried in seats 18 at the opposite sides of the journal-boxes, caps 19 being provided to receive the upper portions of said springs 17.

For supporting the car-body a car-body-supporting frame is provided, consisting of a bolster 20 and side or rocker plates 21, said rocker-plates being secured to the ends of the bolster, as shown in Fig. 2. The ends of the rocker-plates 21 are provided on their under sides with bifurcations adapted to receive the axle-journal boxes, and said rocker-plates are sufficiently narrow so that the lateral movement of said plates upon the journal-boxes is not interfered with.

The car-body-supporting frame is supported upon the equalizer-frame 15 by spiral springs 22, as shown in Fig. 1, and elliptical springs 23 between the spiral springs. The spiral springs rest upon the depressed portion of the equalizer-frame and support the rocker-plates 21. The elliptical springs 23 are mounted between upper and lower pedestal members 24 25, respectively, which pedestal members telescope one within the other, as shown in Fig. 2, the upper member preferably being arranged to fit into the lower member. As shown in Figs. 2 and 3, the rocker-plates 21 are provided on their under sides with rocker-bearings 26, which mesh with corresponding rocker-bearings 27 on the upper side of the upper pedestal member 24. Similarly the lower pedestal member 25 is provided on its under surface with a rocker-bearing 28, which meshes with a rocker-bearing 29 on the upper surface of the lower rocker-plate 30, which is secured to the equalizer-frame 15. In the drawings the side members of the equalizer-frame 15 are shown as being made in two parts, so that the lower rocker-plate 30 fits between said side members and is secured in place by a bolt 31, as shown in Fig. 2.

By the construction above described when the bolster is moved laterally under the inertia of the car-body the upper rocker-plate 21 will cause the upper pedestal member 24 to rock, which motion will be transmitted through the pedestal-legs and the springs 23 to the lower pedestal member 25, so that if the bolster were to move in the direction indicated by the arrow in Fig. 2 the pedestal as a whole there shown would rock upon the inner edge of the upper bearing and the outer edge of the lower bearing. Such rocking of the pedestal would result either in the raising of the load or the compression of the springs 23, and consequently the tendency to rock is resisted by the springs. When the inertia of the car-body is overcome, the springs by their resilience act to return it to its normal position. Instead of using elliptical springs, as shown, springs of other suitable forms may be used, such as spiral springs, either singly or in groups, or where elliptical springs are used instead of locating them longitudinally of the truck they may be located transversely thereof, provided they are so arranged as to be compressed under lateral movement of the car-body.

It will be seen that the upper and lower pedestal members, respectively, form a spring-cap and spring-seat and that they are constructed to move independently of each other in a vertical direction, but to move together in a lateral direction.

I have described my invention in detail, but do not wish to be limited to the specific construction shown, as various modifications may be made without departing from my invention.

That which I claim as my invention, and desire to secure by Letters Patent, is—

1. In a car-truck, a spring-seat and spring-cap constructed to move independently of each other in a vertical direction but to move together in a lateral direction, in combination with a spring, and with upper and lower bearings for said seat and cap constructed to cause the spring to be compressed or the load raised when said upper and lower bearings are moved laterally with relation to each other, substantially as described.

2. In a car-truck, the combination of springs for supporting the car, bearings interposed between the springs and the load, and bearings interposed between the springs and their support, both of said bearings being automatically adjustable to further compress said springs or to raise the car-body, or both, when the car-body moves laterally in relation to the wheels, substantially as described.

3. In a car-truck, the combination of a spring-supported laterally-movable bolster, springs for supporting said bolster, and upper and lower rocking bearings arranged respectively above and below said springs for resisting lateral movement of said bolster and returning it to its normal position, substantially as described.

4. In a truck, a spring-seat and spring-cap, and one or more springs, said seat and cap each having a pair of rocker-bearings constructed to compress said springs or raise the load when said bearings are moved laterally with reference to each other, substantially as described.

5. In a car-truck, the combination of a laterally-movable car-body support, and rocker-bearings therefor which act to resist lateral movement of said support, each of said bearings being arranged to rock when the car-body support moves laterally so as to furnish upper and lower points of support for the car-body which lie at opposite sides of a vertical plane passing through the axis of rotation of the bearing, substantially as described.

6. In a car-truck, the combination of a laterally-movable car-body support, supporting-springs therefor and upper and lower bearings which resist lateral movement of said support, said bearings being arranged respectively above and below said springs, substantially as described.

7. In a car-truck, the combination with a laterally-movable car-body-supporting frame, of rocking spring-supports for said car-body-supporting frame, the springs of said supports being put under increased tension by the rocking thereof, and means for rocking said supports when the car-body-supporting frame moves laterally, substantially as described.

8. In a car-truck, the combination with a laterally-movable car-body support, of upper and lower pedestal members telescopically arranged, rocker-bearings therefor, and one or more springs between said pedestal members, substantially as described.

9. In a car-truck, the combination with a laterally-movable car-body-supporting frame, of upper and lower pedestal members, upper and lower rocker-plates engaging said upper and lower pedestal members respectively, said upper rocker-plate being connected to the car-body-supporting frame, and means independent of the car-body-supporting frame for supporting said lower rocker-plate, substantially as described.

10. In a car-truck, the combination with a laterally-movable car-body-supporting frame, of upper and lower pedestal members telescopically arranged, upper and lower rocker-plates engaging said upper and lower pedestal members respectively, said upper rocker-plate being connected to the car-body-supporting frame, and means independent of the car-body-supporting frame for supporting said lower rocker-plate, substantially as described.

11. In a car-truck, the combination with a laterally-movable car-body-supporting frame, and an equalizer-frame upon which said car-body-supporting frame is mounted, of upper and lower pedestal members telescopically arranged, and upper and lower rocker-plates engaging said upper and lower pedestal members respectively, said upper rocker-plate being connected to the car-body-supporting frame, and said lower rocker-plate being supported by said equalizer-frame, substantially as described.

12. In a car-truck, the combination with springs for supporting the car-body, of upper and lower bearings for said springs, and means for operating said bearings to compress said springs when the car-body moves laterally, substantially as described.

13. In a car-truck, a laterally-movable bolster, in combination with springs for supporting said bolster, said springs having upper and lower rocker-bearings constructed to offer an elastic resistance to the lateral movement of said bolster for the purposes substantially as described.

14. In a car-truck, a laterally-movable bolster, in combination with yielding supporting mechanism therefor, arranged at opposite sides of the truck and constructed to offer an elastic resistance to the lateral or vertical movement of said bolster for the purposes substantially as described.

15. In a car-truck, a laterally-movable bolster, in combination with vertically-disposed supporting-springs mounted in upper and lower rocker-bearings, constructed to cause said springs to offer an elastic resistance to the vertical or lateral movement of said bolster, substantially as described.

16. In a car-truck, the combination of side bars supported from the axle-journal boxes, a laterally-movable bolster, spring-supported therefrom, and mechanism for permitting the lateral movement of said bolster in relation to said side bars, consisting of the supporting-springs for said bolster, and rocker-bearings for said springs, substantially as described.

17. In a car-truck, the combination of side bars supported from the axle-journal boxes, a bolster, spring-supported therefrom, and mechanism for permitting a lateral movement of said bolster in relation to said side bars, consisting of said bolster-springs, and double rocker-bearings for said springs constructed to return said bolster to its normal position in relation to said side bars, substantially as described.

MOSES G. HUBBARD, JR.

Witnesses:
JOHN L. JACKSON,
NELLIE McKIBBEN.